US011029756B2

United States Patent
Hicks et al.

(10) Patent No.: US 11,029,756 B2
(45) Date of Patent: Jun. 8, 2021

(54) DISPLAY WITH PIXEL LEVEL EYE TRACKING

(71) Applicant: Intel Corporation, Santa Clara, CA (US)

(72) Inventors: Richmond F. Hicks, Aloha, OR (US); Khaled Ahmed, Anaheim, CA (US); Divya Pratap, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 15/870,737

(22) Filed: Jan. 12, 2018

(65) Prior Publication Data
US 2019/0041983 A1    Feb. 7, 2019

(51) Int. Cl.
*G06F 3/01* (2006.01)
*G09G 3/20* (2006.01)
*G09G 3/32* (2016.01)

(52) U.S. Cl.
CPC ............ *G06F 3/013* (2013.01); *G09G 3/2096* (2013.01); *G09G 3/32* (2013.01); *G09G 2300/0809* (2013.01); *G09G 2360/14* (2013.01)

(58) Field of Classification Search
CPC .............................. G06F 3/013; G09G 3/2096
See application file for complete search history.

(56) References Cited

U.S. PATENT DOCUMENTS

| 9,936,195 | B2 | 4/2018 | Horesh | |
| 10,319,266 | B1* | 6/2019 | Percival | G09F 9/33 |
| 10,620,457 | B2 | 4/2020 | Ain-Kedem | |
| 2013/0257748 | A1* | 10/2013 | Ambrus | G02B 27/0093 |
| | | | | 345/173 |
| 2015/0260713 | A1* | 9/2015 | Ghaffari | G01N 21/272 |
| | | | | 435/5 |
| 2018/0196509 | A1* | 7/2018 | Trail | G02B 27/0093 |
| 2018/0329489 | A1* | 11/2018 | Price | G02B 27/0172 |
| 2019/0236390 | A1 | 8/2019 | Guo et al. | |
| 2020/0125179 | A1 | 4/2020 | Okuley | |

OTHER PUBLICATIONS

Bergstrom et al., Eye Tracking in User Experience Design, 2014, 7 pages (abstract of book provided).

* cited by examiner

*Primary Examiner* — Kenneth B Lee, Jr.
(74) *Attorney, Agent, or Firm* — Hanley, Flight & Zimmerman, LLC

(57) ABSTRACT

In some examples, a display includes a plurality of display pixels. Each display pixel includes one or more light emitters. At least some of the plurality of display pixels also includes a light detector.

25 Claims, 8 Drawing Sheets

300

400

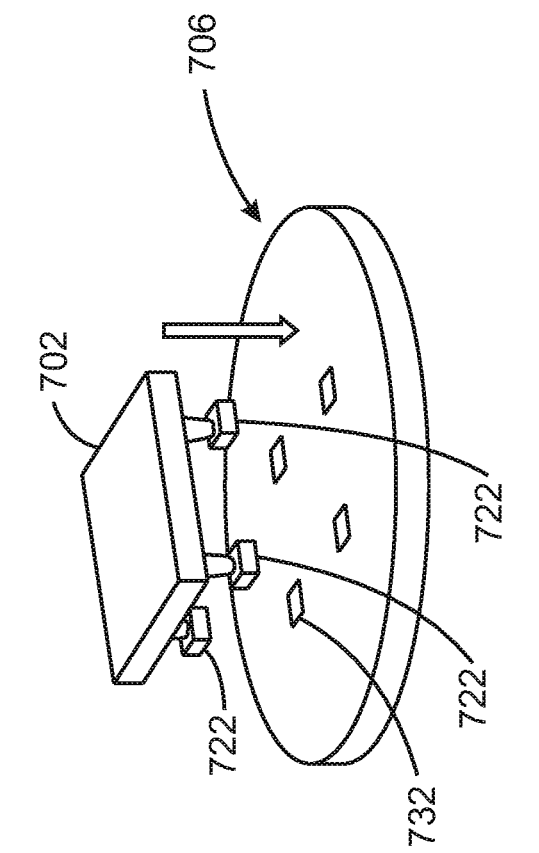
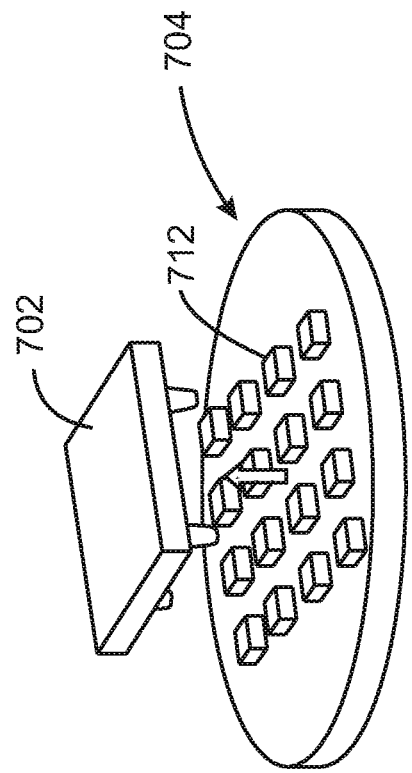
FIG. 7

800

DISPLAY WITH PIXEL LEVEL EYE TRACKING

TECHNICAL FIELD

This disclosure relates generally to display with pixel level eye tracking.

BACKGROUND

It is beneficial for a display system to identify the precise location of where a person viewing the display is looking. This can be referred to as eye tracking or gaze detection, for example. Understanding the location of where a person is looking can provide insight into what the user is focusing on and well as an intention of the user. For example, systems can be used to study reactions of a subject to various stimuli. User reaction can be important, for example, in psychological studies or in checking on the effectiveness of advertising, among other possible implementations. As eye tracking systems decrease in size, less intrusive and lower cost new usages can apply. For example, eye tracking can be used in gaming (for example, with user interaction) or in virtual reality (for example, with foveated rendering).

BRIEF DESCRIPTION OF THE DRAWINGS

The following detailed description may be better understood by referencing the accompanying drawings, which contain specific examples of numerous features of the disclosed subject matter.

FIG. 7 illustrates device transfer between substrates in accordance with some embodiments;

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
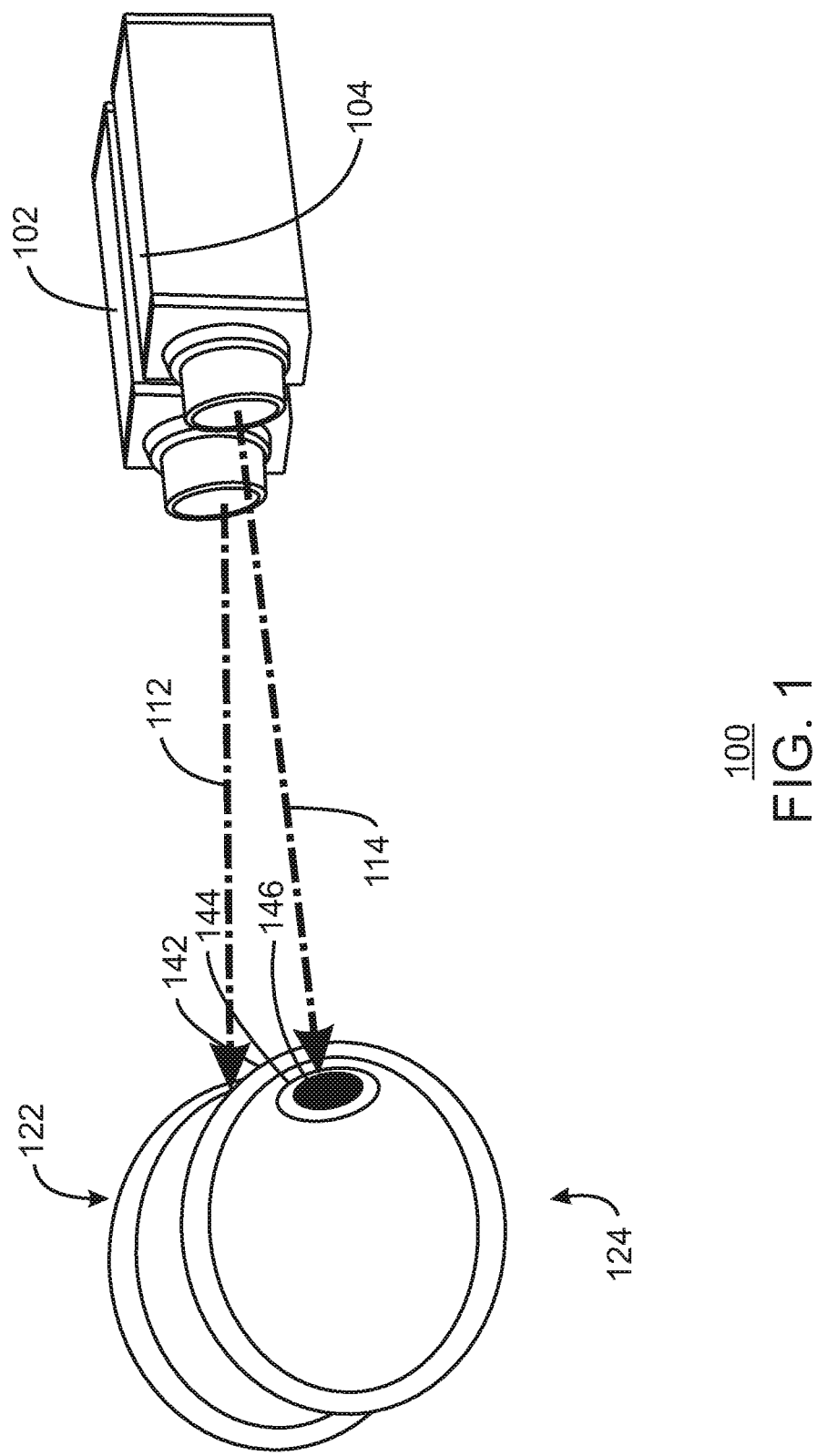
FIG. 1 illustrates eye tracking.

Some embodiments relate to one or more of eye tracking, gaze tracking, or gaze detection relating to a display system.

Location of an eye in space can be implemented using optical and/or physical implementations. The orientation of the eye can then be measured by observing the eye pupil relative to the overall position of the eye. The orientation can be used to calculate a direction of gaze in three dimensions, allowing a system to project the user's gaze direction and determine a location on a display screen where the user is looking. However, precise alignment and calibration of the various components may be required, possibly limiting accuracy of the detection.

According to some embodiments, a gaze or focus point of one or more of a user's eyes can be tracked relative to a display screen of a device such as a computing device (for example, a personal computer, a laptop, a tablet, a phone, or any other device with a display screen). In some embodiments, gaze detection can be incorporated into the display at the display pixel level. This can help the display system to directly detect which pixels are the focus of the user. By incorporating gaze detection into the display pixels, requirements of alignment and trajectory calculation of the user's viewpoint onto the display can be rendered unnecessary.

In some embodiments, accurate pixel resolution eye tracking can be implemented. In some embodiments, the pixels being observed by a user can be directly detected, eliminating any need for precise alignment of components or calibration of the display system.

According to some embodiments, reflected light from an eye can be optically sensed. Additionally, eye movement can be tracked to map a position of the eye movement to interact with a device. The optical sensing and tracking can be integrated into pixels of the display of the device. In some embodiments, photodiodes (for example, micro photodiodes) can be included in one or more pixel (or sub-pixel) of a display to sense eye location. In some embodiments, pixels being observed by a user can be directly detected. Reflected light from an eye and tracking of eye movement can be used at the pixel level of the display.

In some embodiments, the eye of a user can be used as a retroreflector. As light reflects off a retina of the eye of the user, a bright pupil effect occurs that is similar to red eye. According to some embodiments, a small illuminator can be included within one or more pixels (or sub-pixels) of a display that illuminates the eye of the user. If the illumination source of a particular pixel is coaxial with an optical path, the eye acts as a retroreflector. If the illumination source of that pixel is not coaxial with the optical path (for example, is offset from the optical path) the pupil appears dark to a photodetector at that pixel in the display, since the retroreflection from the retina is directed away from the illuminator. In some embodiments, a near infrared micro light emitting diode (µLED) sends near infrared (NIR) light toward the eye of the user, and the reflection is detected by an adjacent micro photodetector (µPD) on each (or some) of the pixels in a display. By placing both the emitter (illuminator) and the detector adjacent to (or at) the pixel (for example, near color LEDs such as RGB LEDs in the pixel, or within the pixel that includes sub-pixels for each color) the retroreflective properties of the user's eye can be used to directly detect which pixels are being observed by the user at any given time.

FIG. 1 illustrates eye tracking 100 using light sources 102 and 104. Light source 102 uses light 112 (for example, near-infrared light) to illuminate an eye 122 of a user. Light source 104 uses light 114 (for example, near-infrared light) to illuminate an eye 124 of a user. Eye 122 and 124 can each be a human eye including a cornea, an iris and a pupil. In some embodiments, eyes 122 and 124 can be a left and right eye of a single user. In some embodiments, eyes 122 and 124 can be eyes of different users. For example, as illustrated in FIG. 1, eye 124 includes a cornea 142, an iris 144, and a pupil 146.

Eye tracking 100 can rely on different ways to detect and track eye location. For example, eye tracking 100 can use corneal reflection to detect and track a location of eye 122 or eye 124 (or of both eyes 122 and 124) as the eye is (or eyes are) moving. Light source 102 can illuminate eye 122 and light source 104 can illuminate eye 124. The illumination of the eye(s) can cause a reflection that is detected by a high-resolution camera (not illustrated in FIG. 1). The image can then be used to identify the reflection of the light source (or the glint) on the cornea (for example, cornea 142) of the eye as well as the location of the pupil (for example, pupil 146) of the eye. One or more glints can be detected to determine a location of the eye in three dimensional space, and the pupil can be used to detect a direction of the gaze.

In some embodiments, a "bright eye" principle can be used rather than identifying a glint on the cornea of the eye. That is, if the illumination is coaxial with the optical path, the eye can act as a retroreflector as the light reflects off the retina of the eye. This can create a bright pupil effect similar to red eye. If the illumination source is offset from the optical path, the pupil can appear dark because the retroreflection from a retina of the eye is directed away from the camera. By subtracting images captured with and without the coaxial illuminator activated, the detector can clearly see the eye when the eye is directed toward the detector/illuminator. In some embodiments, the detector and illuminator can be implemented at a pixel level of the display.

Figure 2:
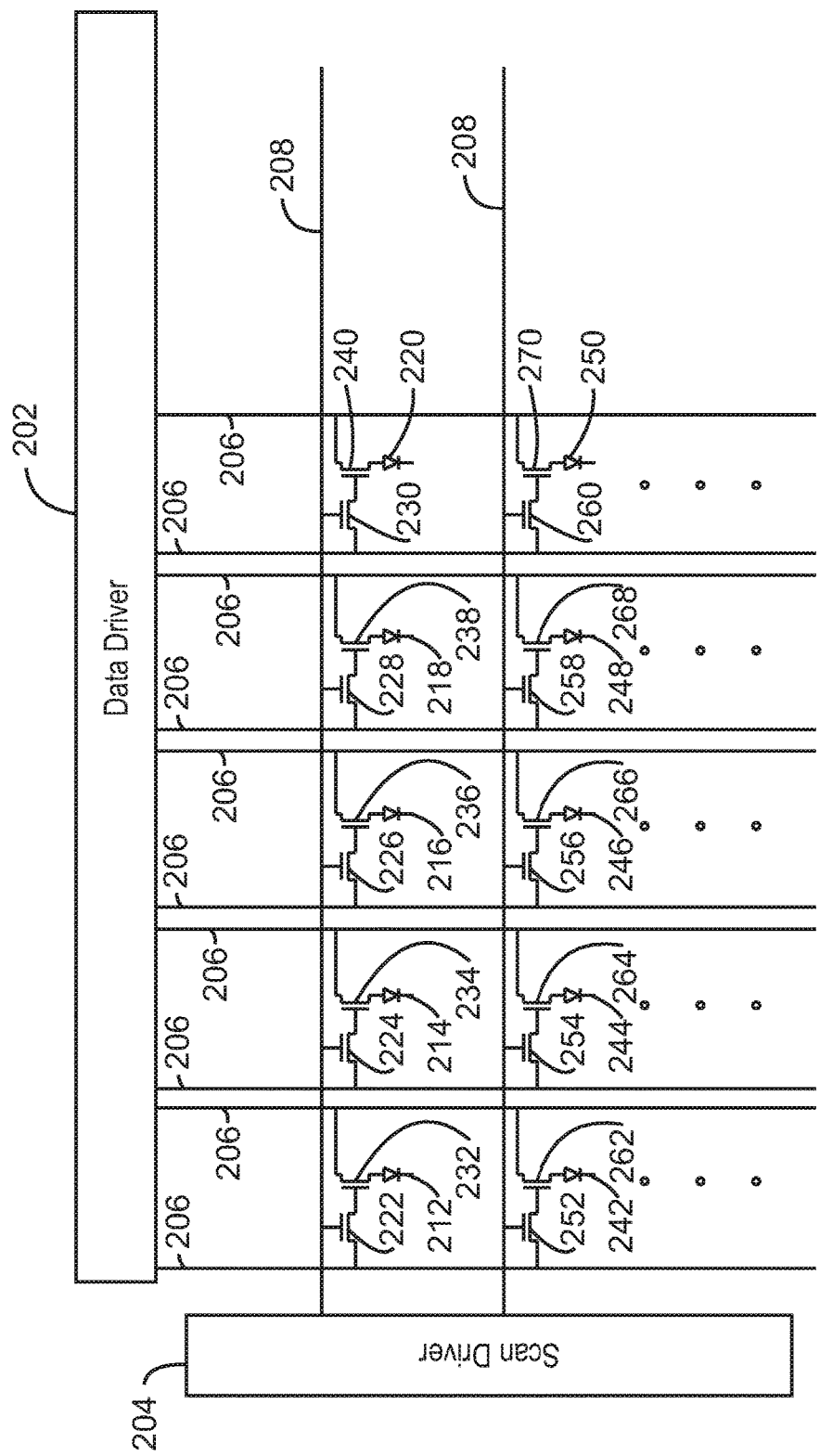
FIG. 2 illustrates a display system in accordance with some embodiments.

FIG. 2 illustrates a display system 200 in accordance with some embodiments. Display system 200 includes a data driver 202 (or source driver), a scan driver 204 (or gate driver). Data driver 202 drives a number of data lines 206 and scan driver 204 drives a number of scan lines 208. In some embodiments, data driver 202 can use data lines 206 and scan driver 204 can use scan lines 208 to apply voltages to the various pixels and subpixels in the display system 200. For simplicity sake, FIG. 2 illustrates two rows each with one pixel, and dots moving down each column showing many pixels per column. Although only two pixels are illustrated in FIG. 2 for sake of description of those two pixels, it is noted that embodiments include more pixels (and can include many more pixels) in each row and include more pixels (and can include many more pixels) in each column.

In a first pixel illustrated in FIG. 2, display system 200 includes light emitting diodes (LEDs) 212, 214, 216, 218 and 220 (for example, micro LEDs or µLEDs), and transistors 222, 224, 226, 228, 230, 232, 234, 236, 238 and 240. In a second pixel illustrated in FIG. 2, display system 200 includes LEDs 242, 244, 246, 248 and 250 (for example, µLEDs), and transistors 252, 254, 256, 258, 260, 262, 264, 266, 268 and 270. In some embodiments, thin film transistors (TFTs) are used as one or more (or all) of transistors 252, 254, 256, 258, 260, 262, 264, 266, 268 and 270.

In some embodiments, display system 200 includes embedded near-infrared (NIR) µLEDs such as, for example, LEDs 218 and 248, and NIR micro photodetectors (µPDs) such as, for example, LEDs 220 and 250. It is noted that photodetectors 220 and 250 are referred to herein as LEDs, it is noted that they need not necessarily emit light, but instead detect light. The embedded µLEDs and µPDs can enable eye tracking with high resolution across the entire display area since they are embedded at the individual pixel level of the display.

In some embodiments, display system 200 can include five subpixels in each pixel. For example, in some embodiments, LED 212 and transistors 222 and 232 are included in a first subpixel (for example, in some embodiments with a red LED 212 or red µLED 212), LED 214 and transistors 224 and 234 are included in a second subpixel (for example, in some embodiments with a green LED 214 or green µLED 214), LED 216 and transistors 226 and 236 are included in a third subpixel (for example, in some embodiments with a blue LED 216 or blue µLED 216), LED 218 and transistors 228 and 238 are included in a fourth subpixel (for example, in some embodiments with an illuminator LED 218, near-infrared or NIR LED 218 or NIR µLED 218), and LED 220 and transistors 230 and 240 are included in a fifth subpixel (for example, in some embodiments with a NIR LED 220, detector LED 220, photodetector LED 220, detector µLED 220, NIR µLED 220, photodetector µLED 220, NIR µLED photodetector 220, etc.) Similarly, in some embodiments, LED 242 and transistors 252 and 262 are included in a first subpixel (for example, in some embodiments with a red LED 242 or red µLED 242), LED 244 and transistors 254 and 264 are included in a second subpixel (for example, in some embodiments with a green LED 244 or green µLED 244), LED 246 and transistors 256 and 266 are included in a third subpixel (for example, in some embodiments with a blue LED 246 or blue µLED 246), LED 248 and transistors 258 and 268 are included in a fourth subpixel (for example, in some embodiments with an illuminator LED 248, near-infrared or NIR LED 248 or NIR µLED 248), and LED 250 and transistors 260 and 270 are included in a fifth subpixel (for example, in some embodiments with a NIR LED 250, detector LED 250, photodetector LED 250, detector µLED 250, NIR µLED 250, photodetector µLED 250, NIR µLED photodetector 250, etc.)

As discussed above, FIG. 2 illustrates two rows each with one pixel, and dots moving down each column showing many pixels per column. Although only two pixels are illustrated in FIG. 2 for sake of description of those two pixels, it is noted that embodiments include more pixels (and can include many more pixels) in each row and include more pixels (and can include many more pixels) in each column. In some embodiments, all pixels can include color LEDs as well as an illuminator (for example, illuminator 218 and associated transistors or illuminator 248 and associated transistors) and a detector (for example, photodetector 220 and associated transistors or photodetector 248 and associated transistors). In some embodiments, some pixels can include color LEDs without an illuminator or detector, and some pixels can include color LEDs as well as an illuminator (for example, illuminator 218 and associated transistors or illuminator 248 and associated transistors) and a detector (for example, photodetector 220 and associated transistors or photodetector 248 and associated transistors).

In some embodiments, a near-infrared (NIR) µLED in each pixel (for example, LED 218 and LED 248) sends NIR light toward one or more eyes of a user of the display. The reflection of the light is detected by an adjacent micro photodetector (µPD) (for example, µPD/µLED 220 and µPD/µLED 250) on each (or some) of the pixels of the display. By placing both the illuminator (emitter) (for example, LED 218 or LED 248) and the detector (for example, LED 220 or LED 250) within the pixel and adjacent to the other subpixels, the retroreflective properties of the eye can be used to directly detect which pixels are being observed at any given time. In some embodiments, a reading is taken with the infrared LED on, then taking a reading with the infrared LED off, and then subtracting the two readings to eliminate ambient illumination effects. For example, in some embodiments, LED 220 or 250 can take a reading with the LED 218 or 248 on, then take a reading with LED 218 or 248 on, and then subtract the two readings.

In some embodiments, system 200 uses a retroreflective principle. LEDs 218 and 248 can be used as illuminators to illuminate one or more eye of one or more user of a display. Only photodiodes coincident with the illuminators that the one or more eyes of the one or more users are observing will light up due to the retroreflective principle. That is, photodiodes where the user is looking will light up. Photodiodes at angles will not light up due to the retroreflective principle. In some embodiments, the eye of a user can be used as a retroreflector. As light from an illuminator such as LED 218 or LED 248 reflects off a retina of the eye of the user, a bright pupil effect occurs that is similar to red eye. According to some embodiments, LED 218 and LED 248 are small illuminators included within respective pixels (or sub-pixels) of a display that illuminates the eye of the user. If the illumination source 218 or 248 of a particular pixel is coaxial with an optical path, the eye acts as a retroreflector. If the illumination source 218 or 248 of that pixel is not coaxial with the optical path (for example, is offset from the optical path) the pupil appears dark to the respective photodetector (220 or 250) at that pixel in the display, since the retroreflection from the retina is directed away from the illuminator 218 or 248. In some embodiments, one or more of LEDs 218 or 248 are a near infrared micro light emitting diode that sends near infrared light toward the eye of the user, and the reflection is detected by the adjacent micro photodetector (220 or 250) on each (or some) of the pixels in a display. By placing both an emitter (illuminator) such as LED 218 or 248 and a detector such as detector 220 or 250 adjacent to (or at) the pixel (for example, near the color LEDs 212, 214, 216 or 242, 244, 246 such as RGB LEDs) the retroreflective properties of the user's eye can be used to directly detect which pixels are being observed by the user at any given time. For example, illuminator 218 and detector 220 can be used to detect if the pixel including LEDs 212, 214, and 216 is being observed by the user, and illuminator 248 and detector 250 can be used to detect if the pixel including LEDs 242, 244, and 246 is being observed by the user.

In some embodiments, the illuminators (for example, LEDs 218 and 248) and detectors (for example, detectors 220 and 250) are on a sufficiently small scale so that they do not interfere with the display function (for example, using the other subpixels within each pixel). This can be accomplished in accordance with some embodiments in which micro LEDs (μLEDs) and micro photodetectors (μPDs) are manufactured on separate wafers and then transferred to the display glass (for example, using a micro transfer printing process). In some embodiments, pick and place may be used to assemble a screen that includes the color LEDs (for example, red, green and blue or RGB LEDs) as well as infrared (IR) LEDs at the pixel level (for example, IR LEDs including an IR LED such as an IR μLED for illumination and a photo LED, photodiode, or micro photodiode).

In some embodiments, active matrix μLED display panels may be used. In some embodiments, gallium nitride based (GaN-based) μLEDs with various colors (for example GaN-based μLEDs with red, green, and blue colors) are first fabricated on separate wafers (for example, silicon or sapphire) and then transferred from wafers to TFT (thin film transistor) backplanes to make pixels (for example, RGB pixels) that make up an active matrix μLED display panel.

In some embodiments, lenses (not illustrated in FIG. 2) can be shaped over each individual pixel. In some embodiments, lenses can be shaped over each individual sub-pixel. In some embodiments, lenses can be placed over micro photodiodes (for example, over photodiode 220 or over photodiode 250 in FIG. 2). This may be implemented in a manner so that the photodiode is only sensitive to light at certain angles, for example. In some embodiments, the photodiodes 220 and 250 can be set up to be sensitive to a certain wavelength of light. However, if a lens is placed over the photodiodes, they can be used by the photodiode to be sensitive to something other than a certain wavelength of light (such as, for example, certain angles of light).

Figure 3:
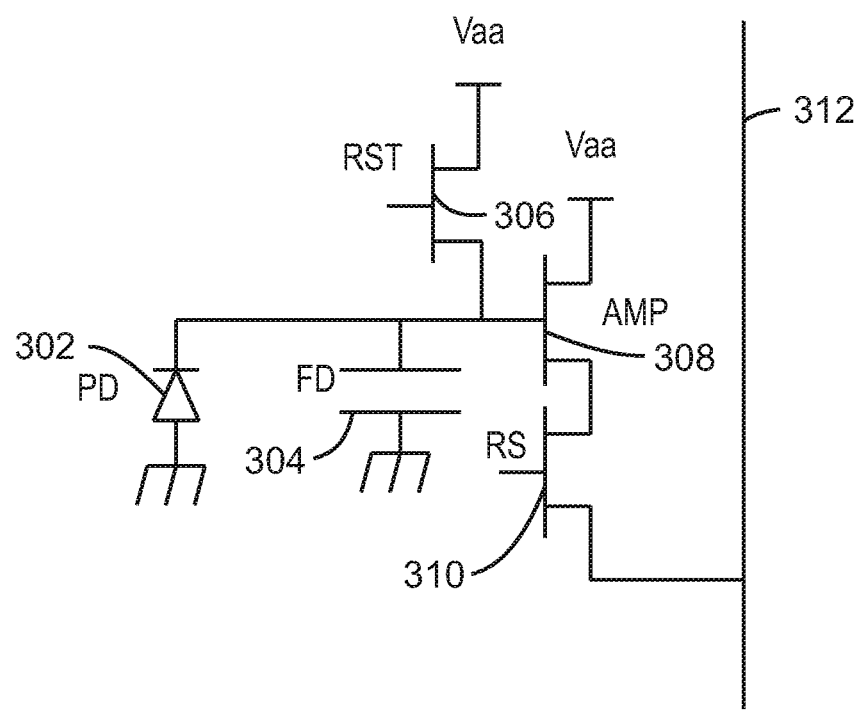
FIG. 3 illustrates a display circuit in accordance with some embodiments.

In some embodiments, the subpixel circuit including photodetector 220, transistor 230, and transistor 240 and the subpixel circuit including photodetector 250, transistor 260, and transistor 270 are simplified. That is, in some embodiments, those subpixel circuits each include one or more additional elements (for example, one or more additional transistor) to read out the value of the light detected by the photo detector 220 or 250. One example of such a subpixel photodetector circuit is illustrated in FIG. 3, for example.

In some embodiments, the μLEDs have sizes in the range of 5 μm (in the range of 5 micrometers) (or in the range of 5 μm by 5 μm or 25 square micrometers). In some embodiments, a display pixel size for a 400 pixel per inch (400 ppi) display might be in the range of around 60 micrometers (60 μm) (or in the range of 60 μm by 60 μm or 3,600 square micrometers). It is therefore possible to fit color (for example, red, green and blue) subpixel μLEDs (for example, LEDs 212, 214, 216, 242, 244, 246) as well as an infrared μLED illuminator source (for example, LEDs 218 and 248) and an infrared micro photodetector μPD (for example, photodetectors 220 and 250) within the pixels of the display. In some embodiments, NIR μLEDs and NIR μPDs are made and then transferred for some or all pixels for high resolution eye tracking.

In some embodiments, an accurate pixel level resolution eye tracking is implemented. In some embodiments, a compact solution for eye tracking is used with no need to place a light source and photodetector near the display (for example, no need to place a light source and photodetector on a bezel of the display) since it is included at the pixel level of the display. In some embodiments, calibration and physical positioning of a relative physical location of illuminators (emitters) and detectors (cameras or photodetectors) is not necessary. According to some embodiments, the display based detector does not need to depend on an alignment of multiple components or a detection of an eye and gaze direction in three dimensional space. In some embodiments, retroreflective properties of the eye may be used to identify a reflected beam from the eye to detect on the display a direction of gaze of the eye. This can be based on characteristics of the eye and its retroreflective nature.

An example of a smallest spot size of a reflected spot with 50% of the total intensity in the plane of the light source can be calculated using the following diffraction limit formula:

$$Q=1.22 \cdot f\lambda/D$$

Where f is the distance, D is the pupil size, and λ is the wavelength.

Given a distance f of 1000 millimeters (1000 mm), a pupil size D of 3 mm, and a wavelength λ of 810 nanometers (810 nm), the smallest spot size Q is around 329 micrometers (329 μm). This corresponds to only a handful of pixels and can provide great accuracy for systems such as desktop computer systems. Additionally, smaller displays such as head mounted displays are viewed at much shorter distances, providing correspondingly better accuracy. This level of accuracy is very sufficient for usages such as, for example, foveated rendering or user interaction usages, among others.

As discussed above, by placing both the illuminator (emitter) (for example, LED 218 or LED 248) and the detector (for example, LED 220 or LED 250) within the pixel and adjacent to the other subpixels, the retroreflective properties of the eye can be used to directly detect which pixels are being observed at any given time. In some embodiments, a reading can be taken with the infrared LED on, then a reading can be taken with the infrared LED off, and then subtracting the two readings to eliminate ambient illumination effects. For example, in some embodiments, LED 220 or 250 can take a reading with the LED 218 or 248 on, and take a reading with LED 218 or 248 off, and subtract the two readings. In this manner, the effects of sunlight (or other ambient light) can be removed.

FIG. 3 illustrates a display circuit 300 in accordance with some embodiments. In some embodiments, display circuit 300 can be included in display system 200. Display circuit 300 is a subpixel photodetector circuit according to some embodiments. Circuit 300 includes a photodetector 302 and/or a light detector 302 (for example, one or more of a photodetector 302, an LED, a μLED 302, a μPD 302, etc.), a capacitor 304, a transistor 306, a transistor 308, a transistor 310, and a column wire 312 (for example, in some embodiments, column wire 312 is one or more of data lines 206 illustrated in FIG. 2). In some embodiments, column wire 312 is an additional line not illustrated in FIG. 2 that is included to read out or provide a value associated with the light detected by the photodetector. In some embodiments, capacitor 304 is optional, and FD represents the voltage at the point between photodetector 302, transistor 306 and transistor 308. In some embodiments, thin film transistors (TFTs) are used as one or more (or all) of transistors 306, 308 and 310. In some embodiments, circuit 300 can be used as a photodetector subpixel of one or more pixels in display system 200. For example, in some embodiments, photodetector 302 is the same as or similar to photodetector 220 or photodetector 250 of display system 200. In some embodiments, circuit 300 can replace either or both of the subpixel including photodetector 220, transistor 230 and transistor 240 of FIG. 2, or the subpixel including photodetector 250, transistor 260 and transistor 270 of FIG. 2.

Figure 4:
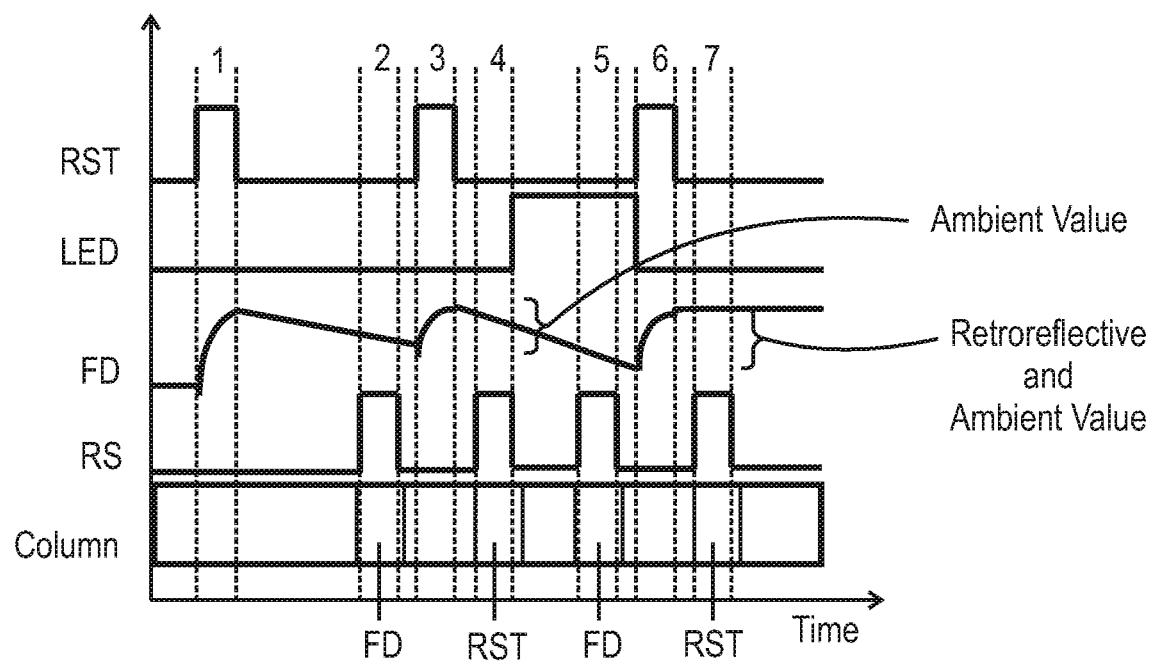
FIG. 4 illustrates a timing diagram in accordance with some embodiments.

FIG. 4 illustrates a timing diagram 400 in accordance with some embodiments. Timing diagram 400 illustrates timing of various features of display circuit 300, and helps understand operation of circuit 300 according to some embodiments. Timing diagram 400 includes time on the horizontal axis (with time periods 1, 2, 3, 4, 5 6, and 7 being shown at the top of FIG. 4). On the vertical axis, timing diagram 400 illustrates reset signal RST (for example, RST in FIG. 3), an LED signal (for example representing an illuminating LED signal from an illuminator located near or adjacent to circuit 300), an FD signal (for example, representing FD voltage in FIG. 3), a row select signal RS (for example, RS in FIG. 3), and a column signal (for example, representing column wire 312 in FIG. 3).

At a time period 1 illustrated in FIG. 4, the PD and FD values are reset (for example using the RST signal). Photodetector 302 is off at this point and the pixel is being set up to read an ambient light level. At time period 2, at the end of a first exposure, row select (RS) is enabled and the FD voltage is read on column wire 312. At time period 3, the pixel is then reset (for example, using RST) a second time to generate a reference voltage (for example, in order to minimize 1/f noise). At time period 4, the reset level (RST) is read out on column wire 312 as a reference for the pixel level, and the ambient light reference level is now known. At the end of this readout during time period 4, the infrared LED (illuminator) coincident with (or adjacent to, or in the same pixel as) the photodiode 302 is energized. At time period 5, at the end of the second exposure, row select (RS) is enabled and the FD voltage is read out on column wire 312. It is noted that this value will be lower than in the reading during time period 2 proportionally to the LED light reflected back into the photodiode 302. At time period 6, the reset level (RST) is reset again to generate a reference voltage (for example, at the end to minimize 1/f noise). At time period 7, the reset level (RST) is read out on column wire 312 and used as a reference for the pixel level. The amount of energy from both the ambient light and the illuminating LED is now known. By subtracting the ambient reading from this level, the LED energy can be isolated. In this manner, circuit 300 can help to eliminate ambient illumination effects in accordance with some embodiments.

In some embodiments, micro LEDs, micro illuminators, and micro photodetectors can be transferred from a wafer (or substrate) to another wafer (or substrate). In some embodiments, a mix of photo emitters and photo detectors can be transferred to the same substrate. In some embodiments, photo emitters and photo detectors can be mixed as needed on the same substrate.

Figure 5:
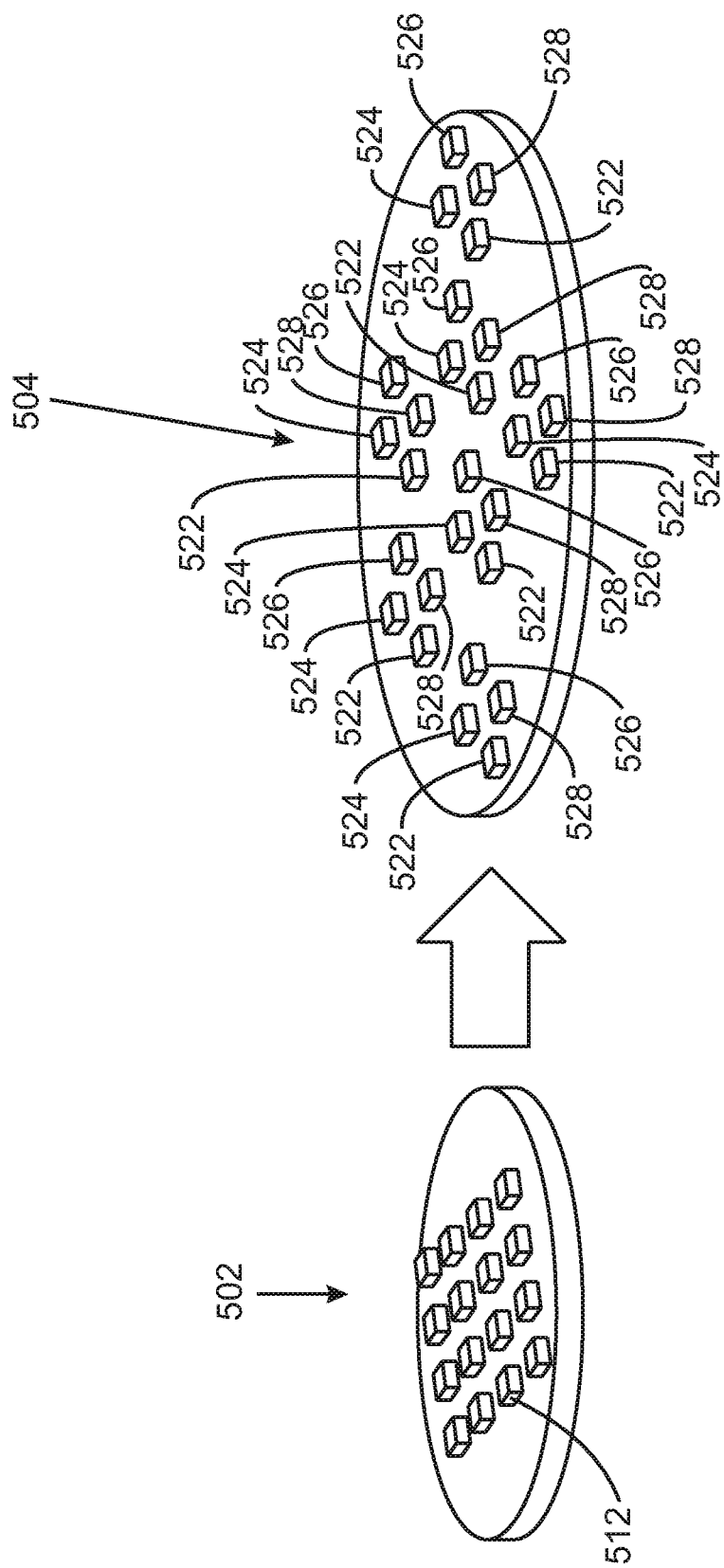
FIG. 5 illustrates assembly of devices in accordance with some embodiments.

FIG. 5 illustrates assembly 500 of devices in accordance with some embodiments. Assembly 500 is illustrated using a source substrate 502 (or source wafer 502) and a target substrate 504 (or target wafer 504). A plurality of devices 512 are included on source substrate 502, and a plurality of devices 522, 524, 526, and 528 are included on target substrate 504. In some embodiments, devices 512, 522, 524, 526, and 528 can include any devices illustrated or described herein. For example, in some embodiments, devices 512, 522, 524, 526, and 528 can include any of the LEDs, transistors, and other devices herein, and in some embodiments they can include any circuits (for example, such as any pixel or subpixel circuits herein such as subpixels of FIG. 2, circuit 300 of FIG. 3, etc)

In some embodiments, μLEDs or μPDs can be included in any of the devices illustrated in FIG. 5. In some embodiments, μLEDs and μPDs can be manufactured on separate wafers (such as wafer 502 or other wafers) and then transferred to a target wafer (such as wafer 504 or other wafers). In some embodiments, devices 512 can include μLEDs that emit different colors fabricated on the same or different wafers (such as wafer 502 or other wafers) and then transferred to backplanes such as TFT backplanes. NIR μLEDs or NIR μLED subpixel circuits including an illuminator, and NIR μPDs or NIR μPD subpixel circuits including a detector, can also be transferred from a wafer such as wafer 502 to wafer 504. In this manner, circuits can be transferred to a target wafer such as wafer 504 to implement techniques such as pixel level eye tracking as described herein.

In some embodiments, wafer 502 can include finished devices 512 on "native" substrates. In some embodiments, technologies such as, for example, one or more of complementary metal oxide semiconductor (CMOS) chiplet on silicon (Si), laser on gallium arsenide (GaAs) or indium phosphide (InP), or LED on sapphire, silicon, or GaAs may be used to construct devices 512, for example. Devices 512 from wafer 502 (or from other wafers) is assembled to the new target wafer substrate 504 with different devices (for example, different micro devices) at specified locations. In some embodiments, layers may be built up post assembly for a system. In some embodiments, devices are peel flex/stretchable from the substrate. In some embodiments, the construction and assembly illustrated in FIG. 5 can be used for versatile system construction from different devices in small form factors. In some embodiments, devices 522, 524, 526 and 528 can be different types of devices. For example, in some embodiments, devices 522 can represent red devices including red LEDs, devices 524 can represent green devices including green LEDs, devices 526 can represent blue devices including blue LEDs, and devices 528 can represent infrared devices including infrared LEDs and/or infrared photodetectors.

Figure 6:
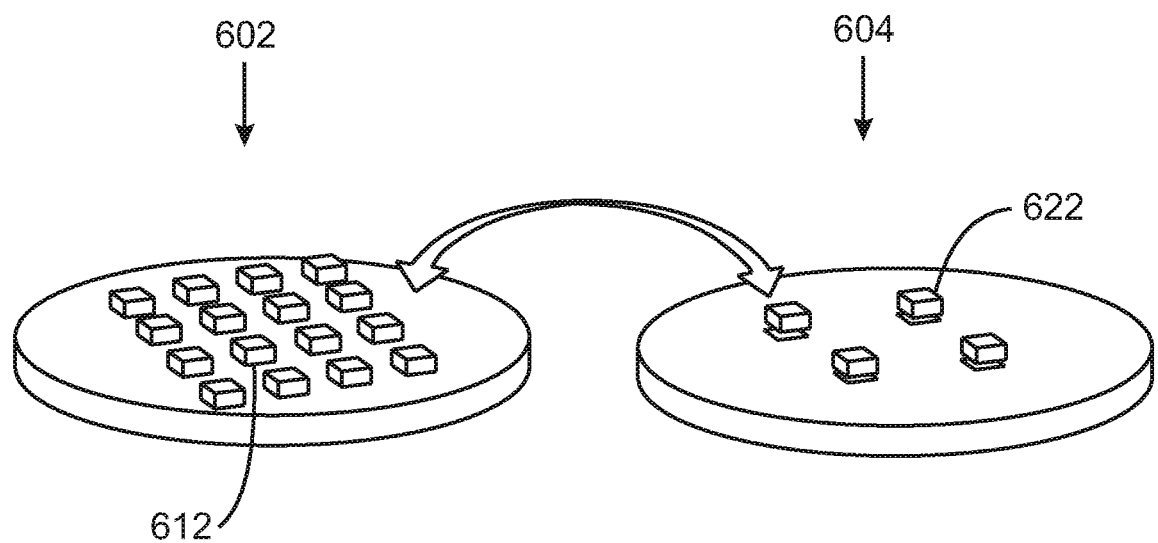
FIG. 6 illustrates device transfer between substrates in accordance with some embodiments.

FIG. 6 illustrates assembly 600 of devices in accordance with some embodiments. Assembly 600 is illustrated using a source substrate 602 and a target substrate 604. A plurality of devices 612 are included on source substrate 602 (or source wafer 602), and a plurality of devices 622 are included on target substrate 604 (or target wafer 604). In some embodiments, devices 612 and 622 can include any devices illustrated or described herein. For example, in some embodiments, devices 612 and 622 can include any of the LEDs, transistors, and other devices herein, and in some embodiments they can include any circuits (for example, such as any pixel or subpixel circuits herein such as subpixels of FIG. 2, circuit 300 of FIG. 3, etc)

In some embodiments, μLEDs or μPDs can be included in any of the devices illustrated in FIG. 6. In some embodiments, μLEDs and μPDs can be manufactured on separate wafers (such as wafer 602 or other wafers) and then transferred to a target wafer (such as wafer 604 or other wafers). In some embodiments, devices 612 can include μLEDs that emit different colors fabricated on the same or different wafers (such as wafer 602 or other wafers) and then transferred to backplanes such as TFT backplanes. NIR μLEDs or NIR μLED subpixel circuits including an illuminator, and NIR μPDs or NIR μPD subpixel circuits including a detector, can also be transferred from a wafer such as wafer 602 to wafer 604. In this manner, circuits can be transferred to a target wafer such as wafer 604 to implement techniques such as pixel level eye tracking as described herein.

In some embodiments, assembly 600 can represent a direct transfer from source wafer 602 to target wafer 604. In some embodiments, wafer 602 can include finished devices 612 on "native" substrates. In some embodiments, technologies such as, for example, one or more of complementary metal oxide semiconductor (CMOS) chiplet on silicon (Si), laser on gallium arsenide (GaAs) or indium phosphide (InP), or LED on sapphire, silicon, or GaAs may be used to construct devices 612, for example. Devices 612 from wafer 602 (or from other wafers) is assembled to the new target wafer substrate 604 with different devices (for example, different micro devices) at specified locations. In some embodiments, layers may be built up post assembly for a system. In some embodiments, devices are peel flex/stretchable from the substrate. In some embodiments, the construction and assembly illustrated in FIG. 6 can be used for versatile system construction from different devices in small form factors. In some embodiments, devices 622 can be different types of devices. For example, in some embodiments, some devices 622 can represent red devices including red LEDs, some devices 622 can represent green devices including green LEDs, some devices 622 can represent blue devices including blue LEDs, some devices 622 can represent infrared devices including infrared LEDs, and/or some devices can represent infrared devices including infrared photodetectors.

FIG. 7 illustrates assembly 700 of devices in accordance with some embodiments. Assembly 700 is illustrated using a stamp 702, a source substrate 704 (or source wafer 704) and a target substrate 706 (or target wafer 706). A plurality of devices 712 are included on source substrate 704, and a plurality of devices 722 are to be included on target substrate 706 using stamp 702 bonding or debonding devices 722 to/from locations 732 on target wafer 706. In some embodiments, devices 712 and 722 can include any devices illustrated or described herein. For example, in some embodiments, devices 712 and 722 can include any of the LEDs, transistors, and other devices herein, and in some embodiments they can include any circuits (for example, such as any pixel or subpixel circuits herein such as subpixels of FIG. 2, circuit 300 of FIG. 3, etc)

In some embodiments, μLEDs or μPDs can be included in any of the devices illustrated in FIG. 7. In some embodiments, μLEDs and μPDs can be manufactured on separate wafers (such as wafer 704 or other wafers) and then transferred to a target wafer (such as wafer 706 or other wafers). In some embodiments, devices 712 can include μLEDs that emit different colors fabricated on the same or different wafers (such as wafer 704 or other wafers) and then transferred to backplanes such as TFT backplanes. NIR μLEDs or NIR μLED subpixel circuits including an illuminator, and NIR μPDs or NIR μPD subpixel circuits including a detector, can also be transferred from a wafer such as wafer 704 to wafer 706. In this manner, circuits can be transferred to a target wafer such as wafer 706 to implement techniques such as pixel level eye tracking as described herein.

In some embodiments, assembly 700 can represent a direct transfer from source wafer 704 to target wafer 706. In some embodiments, wafer 704 can include finished devices 712 on "native" substrates. In some embodiments, technologies such as, for example, one or more of complementary metal oxide semiconductor (CMOS) chiplet on silicon (Si), laser on gallium arsenide (GaAs) or indium phosphide (InP), or LED on sapphire, silicon, or GaAs may be used to construct devices 712, for example. Devices 712 from wafer 704 (or from other wafers) is assembled to the new target wafer substrate 706 with different devices (for example, different micro devices) at specified locations. In some embodiments, layers may be built up post assembly for a system. In some embodiments, devices are peel flex/stretchable from the substrate. In some embodiments, the construction and assembly illustrated in FIG. 7 can be used for versatile system construction from different devices in small form factors. In some embodiments, devices 722 can be different types of devices. For example, in some embodiments, some devices 722 can represent red devices including red LEDs, some devices 722 can represent green devices including green LEDs, some devices 722 can represent blue devices including blue LEDs, some devices 722 can represent infrared devices including infrared LEDs, and/or some devices can represent infrared devices including infrared photodetectors.

In some embodiments, assembly 700 illustrates transfer of devices from source wafer 704 to target wafer 706 using a stamp 702. In some embodiments, stamp 702 can use pickup, bond and release mechanisms. In some embodiments, stamp 702 uses micro die (μdie) pickup to remove devices 712 from wafer 704. In some embodiments, stamp 702 uses μdie bond to bond devices 722 to wafer 706. In some embodiments, stamp 702 uses μdie debond to debond devices 722 from wafer 706. In some embodiments, stamp 702 uses one or more stamp options of PDMS (polydimethylsiloxane), electrostatic, electromagnetic, vacuum, or adhesive, among others.

Figure 8:
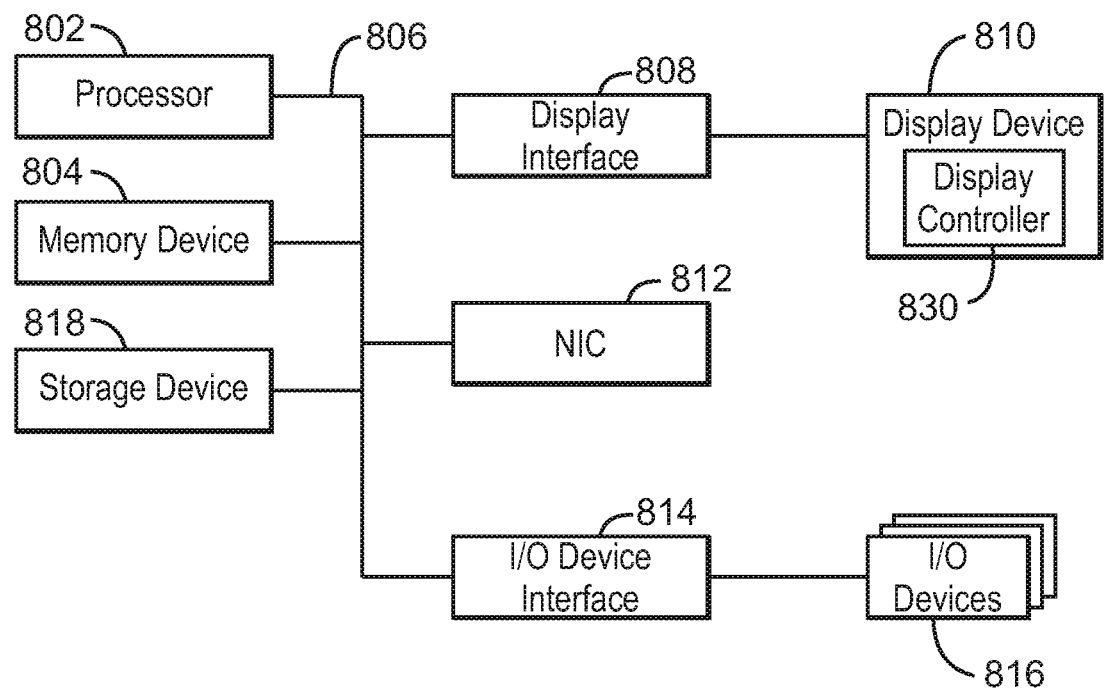
FIG. 8 illustrates a computing device in accordance with some embodiments.

FIG. 8 is a block diagram of an example of a computing device 800. In some embodiments, computing device 800 can be included in a device that can include one or more displays, display systems, display circuits, pixel level eye tracking, and/or any other circuits or functionality as described and/or illustrated herein. The computing device 800 may include a processor 802 that is adapted to execute stored instructions, as well as a memory device 804 (and/or storage device 804) that stores instructions that are executable by the processor 802. The processor 802 can be a single core processor, a multi-core processor, a computing cluster, or any number of other configurations. For example, processor 802 can be an Intel® processor such as an Intel® Celeron, Pentium, Core, Core i3, Core i5, or Core i7 processor. In some embodiments, processor 802 can be an Intel® x86 based processor. In some embodiments, processor 802 can be an ARM based processor. The memory device 804 can be a memory device and/or a storage device, and can include volatile storage, non-volatile storage, random access memory, read only memory, flash memory, and/or any other suitable memory and/or storage systems.

The processor 802 may also be linked through a system interconnect 806 (e.g., PCI®, PCI-Express®, NuBus, etc.) to a display interface 808 adapted to connect the computing device 800 to a display device 810. In some embodiments, display device 810 can include one or more displays, display circuits, DEMUX, and/or any other circuits or functionality as described and/or illustrated herein. The display device 810 may include a display screen that is a built-in component of the computing device 800. The display device 810 may include one or more display panel, display backlight, display controller, display screen, display system, display circuit, pixel level eye tracking, and/or display drivers, for example.

In some embodiments, the display interface 808 can include any suitable graphics processing unit, transmitter, port, physical interconnect, and the like. In some examples, the display interface 808 can implement any suitable protocol for transmitting data to the display device 810. For example, the display interface 808 can transmit data using a high-definition multimedia interface (HDMI) protocol, a DisplayPort protocol, or some other protocol or communication link, and the like In some embodiments, display device 810 includes a display controller. In some embodiments, a display controller can provide control signals within and/or to the display device. In some embodiments, a display controller can be included in the display interface 808 (and/or instead of the display interface 808). In some embodiments, a display controller can be coupled between the display interface 808 and the display device 810. In some embodiments, the display controller can be coupled between the display interface 808 and the interconnect 806. In some embodiments, the display controller can be included in the processor 802. In some embodiments, the display controller can implement functionality according to any of the examples illustrated in any of the drawings and/or as described anywhere herein.

In some embodiments, any of the techniques described in this specification can be implemented entirely or partially within the display device 810. In some embodiments, any of the techniques described in this specification can be implemented entirely or partially within a display controller. In some embodiments, any of the techniques described in this specification can be implemented entirely or partially within the processor 802.

In addition, a network interface controller (also referred to herein as a NIC) 812 may be adapted to connect the computing device 800 through the system interconnect 806 to a network (not depicted). The network (not depicted) may be a wireless network, a wired network, cellular network, a radio network, a wide area network (WAN), a local area network (LAN), a global position satellite (GPS) network, and/or the Internet, among others.

The processor 802 may be connected through system interconnect 806 to an I/O interface 814. I/O interface 814 can be used to couple interconnect 806 with one or more I/O devices 816. One or more input/output (I/O) device interfaces 814 may be adapted to connect the computing host device 800 to one or more I/O devices 816. The I/O devices 816 may include, for example, a keyboard and/or a pointing device, where the pointing device may include a touchpad or a touchscreen, among others. The I/O devices 816 may be built-in components of the computing device 800, or may be devices that are externally connected to the computing device 800.

In some embodiments, the processor 802 may also be linked through the system interconnect 806 to a storage device 818 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 818 can include any suitable applications.

It is to be understood that the block diagram of FIG. 8 is not intended to indicate that the computing device 800 is to include all of the components shown in FIG. 8. Rather, the computing device 800 can include fewer and/or additional components not illustrated in FIG. 8 (e.g., additional memory components, embedded controllers, additional modules, additional network interfaces, etc.). For example, in some embodiments, processor 802 can be one or more processor, and in some embodiments, a display controller of display 810 can include one or more controller (or one or more processor). Some embodiments can include one or more processor (or one or more controller) and one or more tangible, non-transitory computer readable media. The one or more tangible, non-transitory, computer-readable media may be accessed by a processor or processors (for example, such as one or more processors 802 or one or more processors or controllers in a display controller associated with display 810). The computer-readable media may be accessed by the processor or processors over a computer interconnect (for example, such as interconnect 806). Furthermore, the one or more tangible, non-transitory, computer-readable media may include code to direct the processor(s) to perform operations as described herein. For example, in some embodiments, the computer-readable media may include code to direct the processor to control pixel level eye tracking, or any of the display circuits illustrated or described herein according to some embodiments. For example, any of the features described anywhere herein, illustrated in, and/or described in reference to any of the figures can be included in computer code on the computer-readable media. For example, in some embodiments, the computer-readable media can include instructions that can be processed to implement pixel level eye tracking illustrated in and described in reference to FIGS. 2-4.

Various components discussed in this specification may be implemented using software components. These software components may be stored on the one or more tangible, non-transitory, computer-readable media. For example, software components including, for example, computer readable instructions implementing pixel level eye tracking may be included in one or more computer readable media according to some embodiments. Pixel level eye tracking, pixel level eye tracking control, or any other software components may be adapted to direct the processor(s) to perform one or more of any of the operations described in this specification and/or in reference to the drawings.

It is to be understood that any suitable number of software components may be included within the one or more tangible, non-transitory computer-readable media. Any number of additional software components may be included within the one or more tangible, non-transitory, computer-readable media, depending on the specific application.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 includes a display including a plurality of display pixels. Each display pixel includes one or more light emitters. At least some of the plurality of display pixels also includes a light detector.

Example 2 includes the display of example 1, including or excluding optional features. In this example, for at least one of the plurality of display pixels, at least one of the light emitters is to direct light toward an eye of a user of the display, and wherein the light detector is adjacent to the at least one of the light emitters, and the light detector is to detect light reflected off the eye of the user.

Example 3 includes the display of any of examples 1-2, including or excluding optional features. In this example, the light detector is to detect light reflected off a retina of the eye of the user Example 4 includes the display of any of examples 1-3, including or excluding optional features. In this example, a controller is to detect pixels in the display that are being observed by the user in response to the light reflected off the eye of the user.

Example 5 includes the display of any of examples 1-4, including or excluding optional features. In this example, a controller is to control the light detector to detect light when the at least one light emitter is emitting light. The controller is also to detect light when the at least one light emitter is not emitting light. The controller also is to compensate for ambient light based on the detected light when the at least one light emitter is emitting light and based on the detected light when the at least one light emitter is not emitting light.

Example 6 includes the display of any of examples 1-5, including or excluding optional features. In this example, at least one of the light emitters includes a near infrared illuminator and the light detector includes a near infrared photodetector.

Example 7 includes the display of any of examples 1-6, including or excluding optional features. In this example, the one or more light emitters include one or more micro light emitting diodes and the one or more light detectors include one or more micro photodetectors.

Example 8 includes the display of any of examples 1-7, including or excluding optional features. In this example, the display includes a lens placed near the light detector so that the light detector detects light only at certain angles.

Example 9 includes the display of any of examples 1-8, including or excluding optional features. In this example, the light detector detects light only at certain wavelengths.

Example 10 includes a method of detecting display pixels observed by a user of a display. The method includes directing light from a light emitter of one of the display pixels of the display to an eye of the user of the display. The method also includes detecting at a light detector of the one or more display pixels the light from the light emitter reflected off the eye of the user of the display.

Example 11 includes the method of example 10, including or excluding optional features. In this example, the method includes detecting light reflected off a retina of the eye of the user.

Example 12 includes the method of any of examples 10-11, including or excluding optional features. In this example, the method includes detecting pixels in the display that are being observed by the user in response to the detected light.

Example 13 includes the method of any of examples 10-12, including or excluding optional features. In this example, the method includes detecting the light when the light emitter is emitting light, detecting light from the eye when the at least one light emitter is not emitting light, and compensating for ambient light based on the detected light when the at least one light emitter is emitting light and based on the detected light when the at least one light emitter is not emitting light.

Example 14 includes the method of any of examples 10-13, including or excluding optional features. In this example, the method includes directing near infrared light from the light emitter to the eye of the user, and detecting at the light detector near infrared light reflected off the eye of the user.

Example 15 includes the method of any of examples 10-14, including or excluding optional features. In this example, the light emitter includes a micro light emitting diode and the light detector includes a micro photodetector.

Example 16 includes the method of any of examples 10-15, including or excluding optional features. In this example, the method includes detecting light only at certain angles.

Example 17 includes the method of any of examples 10-16, including or excluding optional features. In this example, the method includes detecting light only at certain wavelengths.

Example 18 includes a method of manufacturing a display. The method of manufacturing the display includes placing on a substrate one or more light emitters for each of a plurality of display pixels, and placing on the substrate a light detector for at least one of the plurality of display pixels.

Example 19 includes the method of manufacturing the display of example 18, including or excluding optional features. In this example, the method of manufacturing the display includes placing the light detector for the at least one of the plurality of display pixels adjacent to one or more of the light emitters placed on the substrate for the at least one of the plurality of display pixels.

Example 20 includes the method of manufacturing the display of any of examples 18-19, including or excluding optional features. In this example, at least one of the light emitters includes a near infrared illuminator and the light detector includes a near infrared photodetector.

Example 21 includes the method of manufacturing the display of any of examples 18-20, including or excluding optional features. In this example, the one or more light emitters include one or more micro light emitting diodes and the light detector includes a micro photodetector.

Example 22 includes the method of manufacturing the display of any of examples 18-21, including or excluding optional features. In this example, the method of manufacturing the display includes placing a lens near the light detector so that the light detector only detects light at certain angles.

Example 23 includes the method of manufacturing the display of any of examples 18-22, including or excluding optional features. In this example, the method of manufacturing the display includes placing on the substrate a light detector for each of the plurality of display pixels.

Example 24 includes the method of manufacturing the display of any of examples 18-23, including or excluding optional features. In this example, the method of manufacturing the display includes manufacturing the one or more light emitters on a first source substrate, manufacturing the light detector on a second source substrate, transferring the one or more light emitters from the first source substrate to the substrate, and transferring the light detector from the second source substrate to the substrate.

Example 25 includes the method of manufacturing the display of any of examples 18-24, including or excluding optional features. In this example, the method of manufacturing the display includes transferring of the one or more light detectors and the transferring of the light detector are implanted using a micro transfer printing process.

Example 26 includes the method of manufacturing the display of any of examples 18-25, including or excluding optional features. In this example, the transferring of the one or more light emitters includes picking up the one or more light emitters from the first source substrate and bonding the one or more light emitters to the substrate, and the transferring of the light detector includes picking up the light detector from the second source substrate and bonding the light detector to the substrate.

Example 27 includes the method of manufacturing the display of any of examples 18-26, including or excluding optional features. In this example, the bonding of the one or more light emitters to the substrate and the bonding of the light detector to the substrate include one or more of PDMS (polydimethylsiloxane), electrostatic, electromagnetic, vacuum, or adhesive.

Example 28 includes the method of manufacturing the display of any of examples 18-27, including or excluding optional features. In this example, the transferring of the one or more light emitters includes picking up the one or more light emitters from the first source substrate and stamping the one or more light emitters to the substrate. The transferring of the light detector includes picking up the light detector from the second source substrate and stamping the light detector to the substrate.

Example 29 includes the method of manufacturing the display of any of examples 18-28, including or excluding optional features. In this example, the stamping of the one or more light emitters to the substrate and the stamping of the light detector to the substrate include one or more of PDMS (polydimethylsiloxane), electrostatic, electromagnetic, vacuum, or adhesive.

Example 30 includes a non-transitory computer readable medium comprising instructions that, when executed, direct a processor to direct light from a light emitter of one of the display pixels of the display to an eye of the user of the display, and detect at a light detector of the one or more display pixels the light from the light emitter reflected off the eye of the user of the display.

Example 31 includes the non-transitory computer readable medium of example 30, including or excluding optional features. In this example, the non-transitory computer readable medium includes instructions that, when executed, direct a processor to detect light reflected off a retina of the eye of the user.

Example 32 includes the non-transitory computer readable medium of any of examples 30-31, including or excluding optional features. In this example, the non-transitory computer readable medium includes instructions that, when executed, direct a processor to detect pixels in the display that are being observed by the user in response to the detected light.

Example 33 includes the non-transitory computer readable medium of any of examples 30-32, including or excluding optional features. In this example, the non-transitory computer readable medium includes instructions that, when executed, direct a processor to detect the light when the light emitter is emitting light, to detect light from the eye when the at least one light emitter is not emitting light, and to compensate for ambient light based on the detected light when the at least one light emitter is emitting light and based on the detected light when the at least one light emitter is not emitting light.

Example 34 includes the non-transitory computer readable medium of any of examples 30-33, including or excluding optional features. In this example, the non-transitory computer readable medium includes instructions that, when executed, direct a processor to direct near infrared light from the light emitter to the eye of the user, and to detect at the light detector near infrared light reflected off the eye of the user.

Example 35 includes the non-transitory computer readable medium of any of examples 30-34, including or excluding optional features. In this example, the light emitter includes a micro light emitting diode and the light detector includes a micro photodetector.

Example 36 includes the non-transitory computer readable medium of any of examples 30-35, including or excluding optional features. In this example, the non-transitory computer readable medium includes instructions that, when executed, direct a processor to detect light only at certain angles.

Example 37 includes the non-transitory computer readable medium of any of examples 30-36, including or excluding optional features. In this example, the non-transitory computer readable medium includes instructions that, when executed, direct a processor to detect light only at certain wavelengths.

Example 38 includes a display including a plurality of display pixels. Each display pixel includes at least one or more means for emitting light. At least some of the plurality of display pixels includes means for detecting light.

Example 39 includes the display of example 38, including or excluding optional features. In this example, for at least one of the plurality of display pixels, at least one of the means for emitting light includes means for directing light toward an eye of a user of the display. The means for detecting light is adjacent to the at least one of the means for emitting light. The means for detecting light includes means for detecting light reflected off the eye of the user.

Example 40 includes the display of any of examples 38-39, including or excluding optional features. In this example, the means for detecting light includes means for detecting light reflected off a retina of the eye of the user.

Example 41 includes the display of any of examples 38-40, including or excluding optional features. In this example, the display includes means for detecting pixels in the display that are being observed by the user in response to the detected light reflected off the eye of the user.

Example 42 includes the display of any of examples 38-41, including or excluding optional features. In this example, the display includes means for detecting light when the at least one means for emitting light is emitting light, means for detecting light when the at least one means for emitting light is not emitting light, and means for compensating for ambient light based on the detected light when the at least one means for emitting light is emitting light, and based on the detected light when the at least one means for emitting light is not emitting light.

Example 43 includes the display of any of examples 38-42, including or excluding optional features. In this example, at least one of the means for emitting light includes near infrared illuminator means, and the means for detecting light includes near infrared photodetector means.

Example 44 includes the display of any of examples 38-43, including or excluding optional features. In this example, the one or more means for emitting light include one or more micro light emitting diode means and the one or more means for detecting light include one or more micro photodetector means.

Example 45 includes the display of any of examples 38-44, including or excluding optional features. In this example, the display includes a lens means placed near the means for detecting light. The lens means can cause the means for detecting light to detect light only at certain angles.

Example 46 includes the display of any of examples 38-45, including or excluding optional features. In this example, the means for detecting light detects light only at certain wavelengths.

Example 47 includes an apparatus including means to perform a method as in any other example.

Example 48 includes machine-readable storage including machine-readable instructions, when executed, to implement a method or realize an apparatus as in any other example.

Example 49 includes a machine readable medium including code, when executed, to cause a machine to perform the method of any one or more of the other examples.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A display comprising:
   a plurality of display pixels, a first pixel of the plurality of display pixels including:
   a light emitter to emit near infrared light; and
   a light detector to output a first signal indicative of detection of reflection of the near infrared light from an eye of a user in response to emission of the near infrared light by the light emitter, the light detector to output a second signal in the absence of the reflected near infrared light; and
   a processor in communication with the display to:
   subtract the second signal from the first signal to generate an adjusted first signal;
   determine, based on the adjusted first signal, that the first pixel is being observed by the user if a path of illumination of the near infrared light emitted by the light emitter is coaxial with an optical path associated with the reflection of the near infrared light off the eye of the user; and
   detect, based on the adjust first signal, that the first pixel is not being observed by the user if the path of illumination of the near infrared light emitted by the light emitter of that pixel is not coaxial with the optical path.

2. The display of claim 1, wherein the light detector is adjacent to the light emitter.

3. The display of claim 1, wherein the light detector is to detect the near infrared light reflected off a retina of the eye of the user.

4. The display of claim 1, wherein the adjusted first signal is to compensate for ambient light in an environment including the display.

5. The display of claim 1, wherein of the light emitter includes a near infrared illuminator and the light detector includes a near infrared photodetector.

6. The display of claim 1, further including a lens proximate to the light detector, the lens to affect an angle at which the light detector is to detect the near infrared light.

7. The display of claim 1, wherein the light detector is to detect the reflected near infrared light at certain wavelengths.

8. A method of detecting display pixels observed by a user of a display, the method comprising:
   subtracting second signal data from a light detector of a first pixel of the display from first signal data from the light detector to generate first adjusted signal data, the first signal data generated by the light detector in response to detection of reflection of near infrared light from an eye of a user by the light detector, the near infrared light emitted by a light emitter of the first pixel or a second pixel of the display, the second signal data generated by the light detector in the absence of the reflected near infrared light;
   determining, by executing an instruction with a processor and based on the first adjusted signal data, that the first pixel is being observed by the user if a path of illumination of the near infrared light is coaxial with an optical path associated with the reflection of the near infrared light off the eye of the user; and
   determining, by executing an instruction with the processor and based on the first adjusted signal data, that the first pixel is not being observed by the user if the path of illumination of the near infrared light from the light emitter is not coaxial with the optical path.

9. The method of claim 8, wherein the first signal data is indicative of the near infrared light reflected off a retina of the eye of the user.

10. The method of claim 8, wherein the adjusted first signal data is to compensate for ambient light in an environment including the display.

11. The method of claim 8, wherein the first signal data is indicative of the reflected near infrared light detected by the light detector at certain angles.

12. The method of claim 8, wherein the first signal data is indicative of the reflected near infrared light detected by the light detector at certain wavelengths.

13. A method of manufacturing a display, the method comprising:
   placing on a substrate one or more light emitters for each of a plurality of display pixels, the one or more light emitters to emit near infrared light toward an eye of a user of the display;
   placing on the substrate a light detector for at least one of the plurality of display pixels, the light detector to detect reflection of the near infrared light emitted by the one or more light emitters from the eye of the user; and
   placing a lens over the light detector to affect an angle of the near infrared light detected by the light detector, the lens not over the one or more light emitters.

14. The method of manufacturing the display of claim 13, further including placing the light detector adjacent to one of the light emitters.

15. The method of manufacturing the display of claim 13, wherein at least one of the light emitters includes a near infrared illuminator and the light detector includes a near infrared photodetector.

16. The method of manufacturing the display of claim 13, wherein the light detector is a plurality of light detectors, and further comprising placing on the substrate respective ones of the light detectors for each of the plurality of display pixels.

17. The method of manufacturing the display of claim 13, further including:
   manufacturing the one or more light emitters on a first source substrate;
   manufacturing the light detector on a second source substrate;
   transferring the one or more light emitters from the first source substrate to the substrate; and
   transferring the light detector from the second source substrate to the substrate.

18. The method of manufacturing the display of claim 17, wherein the transferring of the one or more light emitters and the transferring of the light detector includes using a micro transfer printing process.

19. The method of manufacturing the display of claim 17, wherein the transferring of the one or more light emitters includes picking up the one or more light emitters from the first source substrate and bonding the one or more light emitters to the substrate and the transferring of the light detector comprises picking up the light detector from the second source substrate and bonding the light detector to the substrate.

20. The method of manufacturing the display of claim 19, wherein the bonding of the one or more light emitters to the substrate and the bonding of the light detector to the substrate include using one or more of PDMS (polydimethylsiloxane), electrostatic, electromagnetic, vacuum, or adhesive.

21. The method of manufacturing the display of claim 17, wherein the transferring of the one or more light emitters includes picking up the one or more light emitters from the first source substrate and stamping the one or more light emitters to the substrate and the transferring of the light detector includes picking up the light detector from the second source substrate and stamping the light detector to the substrate.

22. The method of manufacturing the display of claim 21, wherein the stamping of the one or more light emitters to the substrate and the stamping of the light detector to the substrate includes using one or more of PDMS (polydimethylsiloxane), electrostatic, electromagnetic, vacuum, or adhesive.

23. The display of claim 1, wherein the light emitter includes one or more micro light emitting diodes and the light detector includes one or more micro photodetectors.

24. The method of claim 8, wherein the light emitter includes a micro light emitting diode and the light detector includes a micro photodetector.

25. The method of manufacturing the display of claim 13, wherein the one or more light emitters include a micro light emitting diode and the light detector includes a micro photodetector.

* * * * *

UNITED STATES PATENT AND TRADEMARK OFFICE
CERTIFICATE OF CORRECTION

PATENT NO. : 11,029,756 B2  
APPLICATION NO. : 15/870737  
DATED : June 8, 2021  
INVENTOR(S) : Richmond F. Hicks et al.

Page 1 of 1

It is certified that error appears in the above-identified patent and that said Letters Patent is hereby corrected as shown below:

In the Claims

Column 19, Line 28:
Delete "of that pixel".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*